US005155615A

United States Patent [19]

Tagawa

[11] Patent Number: 5,155,615

[45] Date of Patent: Oct. 13, 1992

[54] MINIATURE DISPLAY DEVICE FOR USE IN A MINIATURE ELECTRONIC APPARATUS

[75] Inventor: Takao Tagawa, Kashihara, Japan

[73] Assignee: Sharp Kabushiki Kaisha, Osaka, Japan

[21] Appl. No.: 336,124

[22] Filed: Apr. 11, 1989

[30] Foreign Application Priority Data

Apr. 15, 1988 [JP] Japan .................. 63-93845

[51] Int. Cl.[5] .................. G02B 26/08; G09G 3/02

[52] U.S. Cl. .................. 359/213; 359/199; 359/225; 340/705

[58] Field of Search .................. 350/174, 167, 6.5, 3.71, 350/255, 6.1–6.91, 97–100, 269–275; 340/702, 700–706, 711–713, 720–724, 757, 815.01–815.09; 356/153; 354/402, 418; 358/85; 352/141; 250/234–236, 561, 563; 359/196–226

[56] References Cited

U.S. PATENT DOCUMENTS

| | | | |
|---|---|---|---|
| 3,657,981 | 4/1972 | Benton | 350/167 |
| 3,992,619 | 11/1976 | VanBuskirk | 350/6.5 |
| 4,067,640 | 1/1978 | Shogren | 350/6.5 |
| 4,082,432 | 4/1978 | Kirschner | 350/174 |
| 4,099,172 | 7/1978 | Montanari et al. | 350/6.4 |
| 4,457,580 | 7/1984 | Klose | 340/702 |
| 4,521,113 | 6/1985 | Kuwasara et al. | 350/6.91 |
| 4,636,866 | 1/1987 | Hattori | 340/705 |
| 4,902,083 | 2/1990 | Wells | 350/6.91 |
| 4,934,773 | 6/1990 | Becker | 350/6.6 |

FOREIGN PATENT DOCUMENTS

| | | | |
|---|---|---|---|
| 220417 | 11/1985 | Japan | 340/705 |

OTHER PUBLICATIONS

Optics—9th Edition—Fincham et al—Butterworth (1980) Chapter 6, pp. 88–89.

*Primary Examiner*—Bruce Y. Arnold
*Assistant Examiner*—Thong Nguyen

[57] ABSTRACT

A miniature display device formed in such a manner that a magnification lens is disposed between the vibration mirror and the observation position. Further light emitting elements are situated at the focus position of the magnification lens. Thus, a miniature display device is formed which is appropriate for use in a small-sized electronic apparatus such as a hand-held mini-computer.

13 Claims, 3 Drawing Sheets

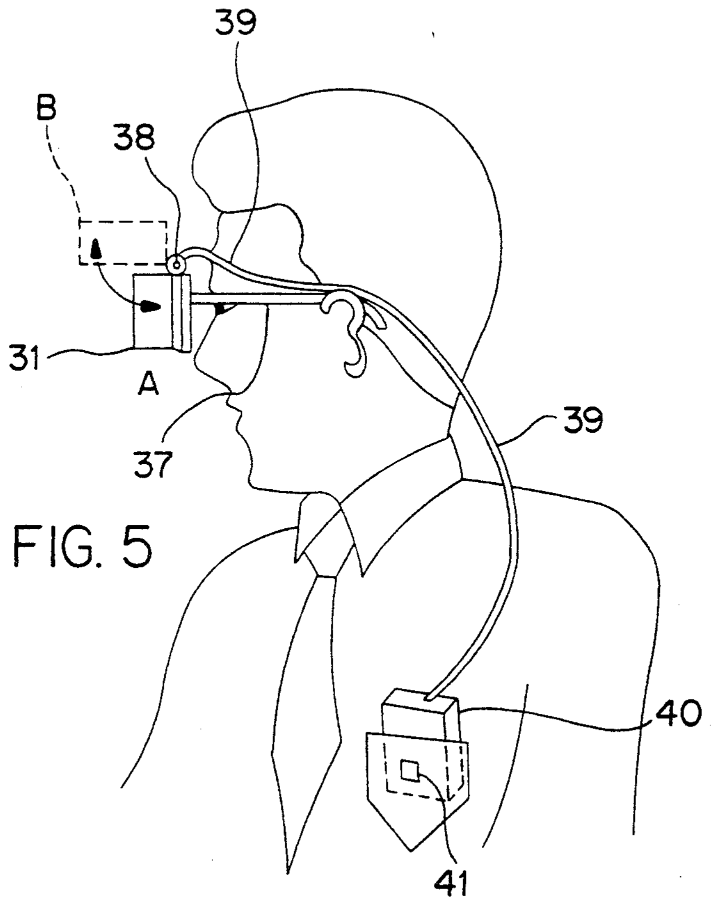
FIG. 5
FIG. 6
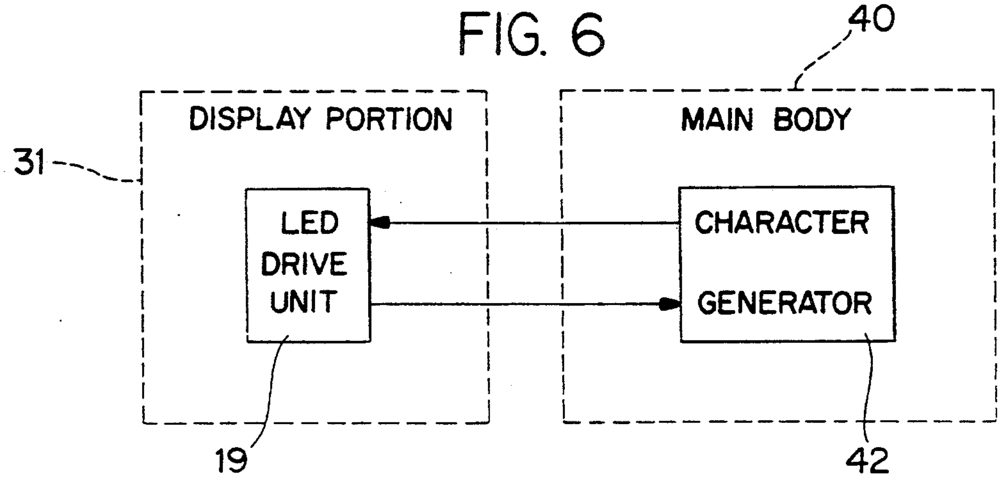

MINIATURE DISPLAY DEVICE FOR USE IN A MINIATURE ELECTRONIC APPARATUS

BACKGROUND OF THE INVENTION

1. Field of the Invention

The present invention relates to a miniature display device appropriate for use in a small-sized electronic apparatus such as a hand-held mini-computer. More particularly it relates to a display device used in a hand-held mini-computer, such as a paging system and a data collecting device, acting as a selected calling receiver. This device may be carried in a local station by each of workers, for example, in a building or factory or by each of a plurality of salesmen in a business office. Any receiver can be specified as a local station by a calling signal sent from a central station provided in a control room in a factory in an office. The central station sends a message signal to a receiver in a local station so that the received message signal is displayed on the display device provided on the receiver.

2. Description of the Prior Art

In a paging system, for example, different from a transceiver for vocal communication, a message signal is mainly sent from a central station to each of selected calling receivers in local stations via one-way transmission. The receiver can be made so small-sized as to be carried by a worker in his pocket. Moreover, different from a pocket bell utilized only for calling out, there is an advantage in a paging system in that a message signal is received by a receiver to be stored in a memory unit. Therefore, the contents of the message received by the receiver can be displayed on a display unit so as to be visualized.

Also, in a mini-computer such as a data collecting device, there has been generally provided a display unit composed of e.g. LCD (Liquid Crystal Display) or EL (Electro Luminescence) display elements.

However, in order to display a large amount of data on the display unit in the selected calling receiver device, it is necessary to provide a display unit with a large display frame of, for example, a CRT (cathode ray tube), LCD and EL display. Thus, in this case, the scale of the receiver becomes so large that it is inconvenient for use as a hand-held type receiver. Therefore, the receiver is provided with a display unit capable of displaying only, at most, several characters or numerals. Accordingly, a large volume of data as displayed on the display unit in the central station can not be displayed on the display unit in the receiver. In other words, the display of the message is limited, so that such a conventional display unit has been inconvenient for practical use.

Also, the display unit of the mini-computer must be provided with line display elements of, for example, LCD or EL, so as to be a large scale display unit with a large frame.

SUMMARY OF THE INVENTION

The present invention has been devised considering the problem as mentioned above, and an essential object of the present invention is to provide a miniature display unit capable of displaying a volume of data, generally as much as in the CRT.

One feature of the present invention is that the miniature display unit according to the present invention includes;

a light source having a plurality of light emitting elements' array of one dimension, a vibration mirror disposed in a position opposite to the light source for obtaining a two-dimensional image of the light source, a device for controlling the drive of the light emitting elements of the light source based on the displayed data under being synchronized with the vibration of the vibration mirror, and an optical device such as lenses for enlarging the two-dimensional image obtained by the vibration mirror.

Further, the optical device is disposed between the vibration mirror and the observation position, and the position of the light emitting elements is situated at the focus position of the optical device.

According to the above-mentioned feature of the present invention, a plurality of light emitting elements arrayed in one dimension are used as a light source and a two-dimensional image of the light source is obtained by driving the vibration mirror at a high speed. That is to say, an operation equivalent to a scanning in a vertical directivity on a CRT display is performed by driving the vibration mirror. Then, a signal equivalent to a display along a horizontal scanning line is generated, on the basis of the message data by a driving unit, by driving the light source, and turning the light source on and off during one period of the scanning operation of the mirror. Therefore, large volume of data of two dimensions can be displayed on the basis of the data signals sent from the light source having light emitting elements arrayed in one dimension. Accordingly, with a miniature display unit of the present invention provided in a hand-held and portable electronic device, a large amount of data can be displayed on the miniature display unit. The data displayed is generally equal to the amount of the data displayed by a large scale display unit, such as CRT display unit.

BRIEF DESCRIPTION OF THE DRAWINGS

FIG. 5 illustrates the display device as adapted, in a second preferred embodiment, to a paging system or pocket computer; and FIG. 6 illustrates the interconnection of the main body and the display unit for image data signal generation.

DETAILED DESCRIPTION OF THE PREFERRED EMBODIMENT

A preferred embodiment of the present invention is described hereinafter with reference to the attached drawings.

Figure 1:
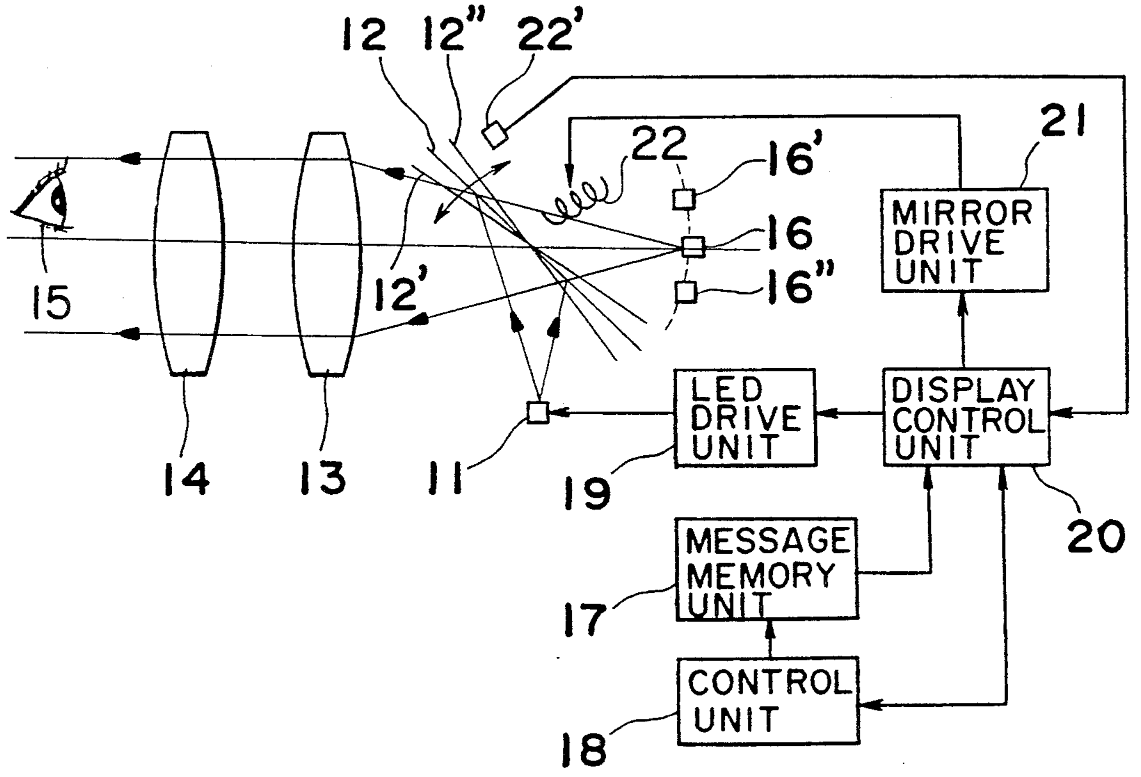
FIG. 1 is a schematic diagram showing a construction of a message display unit according to the present invention.

FIG. 1 shows a preferred embodiment of the present invention appropriate for use in a message display unit of a receiver in a local station of a paging system.

In FIG. 1, reference numeral 11 denotes a light source of a light emitting diode (referred to as LED hereinafter) array composed of a one dimensional monolithic array of high density, for example, 20 dots/mm. In FIG. 1, though there is shown only one LED element, a plurality of LED elements are disposed in series in a direction perpendicular to the surface of the drawing paper. Further, assuming that the length of the LED array is generally 10 mm for example, the amount of the number of the LED elements becomes to be a degree of 200 dots. In order to make the LED array with high density of light emitting elements, the LED elements may be arranged in two zigzag lines. Reference numeral 19 denotes a LED driving unit for driving each of the LEDs in the LED array 11 individually. In the case the LED arrays are arranged in two zigzag lines, the timing of turning on one of the LED arrays must be so delayed that one of the two LED arrays is alternately turned on. Moreover, as the other method for obtaining the LED with high density, the zigzag array of LEDs can be utilized as an array of LEDs in one line using a bar shaped lens having a function of focusing only in one dimension.

Reference numeral 12 denotes a vibration mirror (galvano-mirror) which is disposed opposing the light source 11 for obtaining two-dimensional images of the light source 11. The vibration mirror 12 is driven by a mirror driving unit 21 and a mirror driving coil 22 in a direction shown by arrow marks as 12→12'→···→12'→12→12''→···→12''→12→12'→···. The image of the LED array 11 is moved as 16→16'→···→16'→16→16''→··· →16''→16→16'→··· by driving the vibration mirror 12 so that a two-dimensional image can be obtained from the LED array 11 arranged in one dimension. Reference numerals 13 and 14 denote optical devices composed of e.g. lenses for enlarging a display of a two-dimensional image of the LED array obtained through the vibration mirror 12. Reference numeral 15 represents the position for observing the received message displayed on the display device.

Reference numeral 17 denotes a memory unit for storing the message data to be displayed on the display unit. References numeral 18 denotes a control unit for controlling the entire device. Further, reference numeral 20 denotes a display control unit for generating a mirror driving signal and LED driving signal to the mirror driving unit 21, and to the LED driving unit 19, respectively, by synchronizing the message data signal transmitted from the message memory unit 17 with the movement of the vibration mirror 12 on the basis of the timing signal transmitted from the control unit 18. The details thereof will be described later. The LED driving unit 19 drives the respective elements of the LED array 11 individually in response to the driving signal synchronized with the vibration of the vibration mirror 12. The mirror driving unit 21 drives the mirror driving coil 22 in accordance with the mirror driving signal so as to drive the vibration mirror 12. Reference numeral 22' denotes a mirror position detector for detecting the position of the vibration mirror 12. The signal for detecting the mirror position generated by the detector 22' is transmitted to the display control unit 20.

Figure 3:
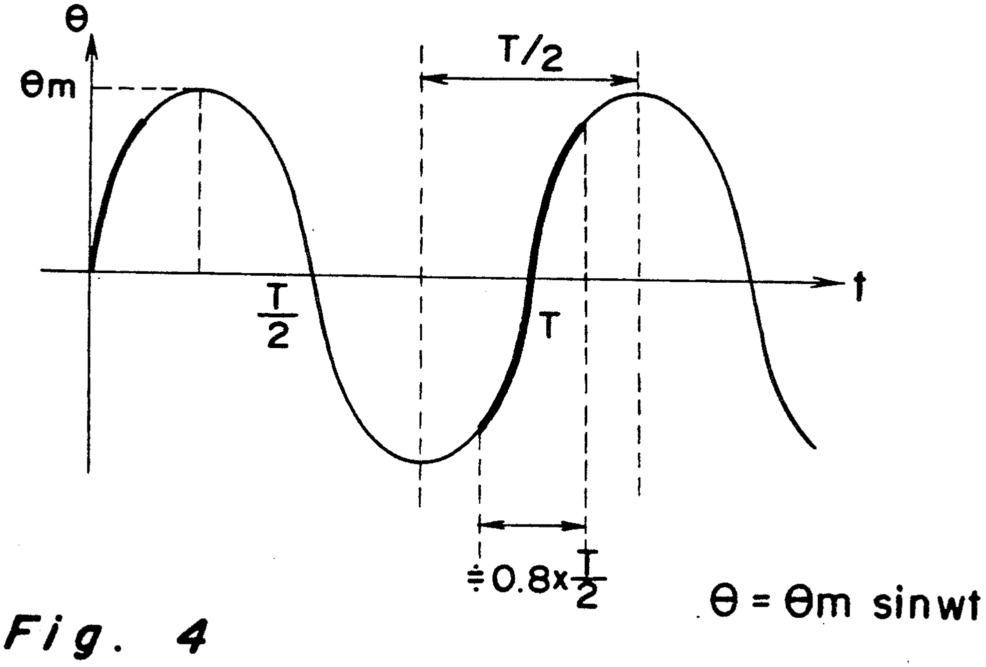
FIG. 3 is a graph showing a vibration angle of a vibration mirror.
Figure 4:
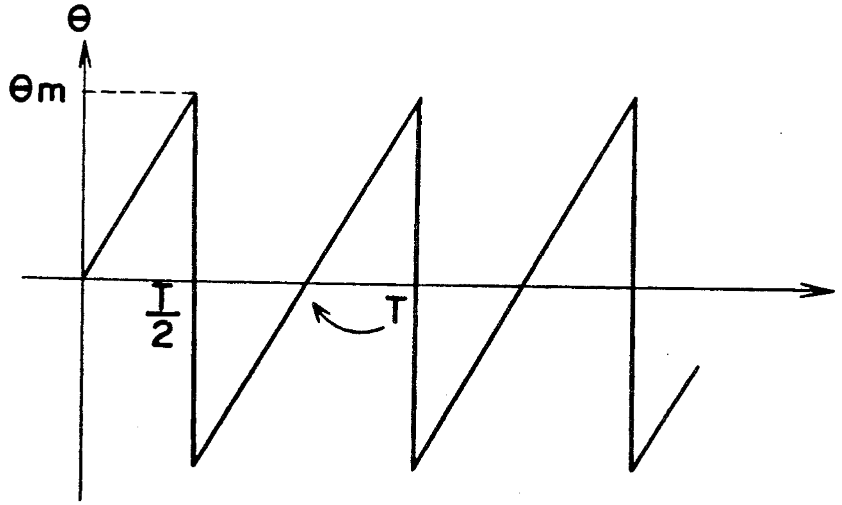
FIG. 4 is a graph showing an ideal vibration angle of vibration a mirror.

Next, the display control operation of the driving system of the LED array 11 and the vibration mirror 12 will be described in detail. The vibration of the vibration mirror 12 corresponds to the vertical scanning of a display, such as a CRT display. Since it is necessary that a plurality of images due to the vibration of the mirror should be seen as one image due to the afterimage effect of the observer, therefore, the necessary frequency of the vibration is 20 to 60 per second. The vibration mirror 12 is vibrated by applying an electric current flowing through the mirror driving coil 22 by the mirror driving unit 21. The vibration angle $\theta$ may be represented as a sine wave vibration as shown in FIG. 3. Further, so far as a distortion of an image is concerned, a sawtooth vibration is preferable as the vibration angle of the vibration mirror as shown in FIG. 4 because there occurs a distortion of an image to be obtained. Therefore, in the case the vibration angle of the mirror is represented as a sine wave vibration as shown in FIG. 3, only a part of 80% of the half period having comparatively a little distortion of the image and having a nearly straight line is available as an effect range of the image as shown by thick lines in FIG. 3. A clock frequency of a clock signal for emitting the LED array 11 is made changeable to be corrected. In this case, though all of the clock frequencies must be continuously varied in order to obtain a complete lineality, according to a result of an examination, it turned out that it is not necessary to perform such a process. It is merely enough to vary the clock frequencies in three or four stages such as a middle, near peripheral and peripheral portions.

Therefore, a basic pulse signal having a frequency higher than the clock frequency was previously generated and divided so as to obtain a clock signal, that was a simple and exact way. In other words, it is enough to vary the scanning period of the middle portion and the scanning period of the peripheral portion in three or four stages.

The method for varying the clock frequency in accordance with the scanning position is not limited to this and other methods. A method such as that employing Phase Locked Loop (referred to as PLL hereinafter) may be adopted.

Moreover, since the angular velocity of the vibration mirror 12 is not constant, the brightness of the display is varied in accordance with the position. Therefore, the brightness thereof must be corrected in order to obtain a display with a high quality of an image. However, such correction of the brightness can be easily performed by using a microelectronic techniques.

For the vibration mirror 12 a resonant type vibration mirror with a mechanical resonance frequency of 20 to 60 Hertz is suitable and a resonant type vibration mirror with a high value of Q of the vibration system is also suitable. The reason why a resonance type with high value of Q is adopted is that, when an vibration system is driven with a resonance frequency of the vibration, a large vibration of the vibration system can be obtained with low electric power by periodically storing the movement energy. Thus, the consumption of the electric power for operating the device is reduced. This results in the device of the vibration system being made small and light.

Another reason is that, since the vibration shows a right sine wave, the accuracy of the waveform is so high that the flicker due to the difference of the wave form between the back and forth frames is not remarkable. Furthermore, since the resonance type can be strongly-made against a shock given from outside, it is suitable for a miniature portable device.

Judging from the distortion of the image, though the wave form of the resonance type oscillation is inferior to the sawtooth oscillation as shown in FIG. 4, the distortion of the image can be easily corrected by means of a microelectronic techniques as described above. Thus, the defect with respect to the distortion can be removed. Therefore, the resonance type of the vibration system can be used as a remarkably effective means for the portable display device.

As the result that the vibration system is driven with a resonance frequency, also the mirror driving unit 21 generates a driving voltage by using a feed back signal transmitted from the mirror position detector 22'. In other words, the mechanical vibration per se of the vibration mirror 12 works as a part of an oscillator, which generates a vibration signal of the resonance frequency of the vibration of the mirror.

The mirror position detector 22' transmits a synchronizing signal to the display control unit 20 which transmits another signal for emission to the LED driving unit 19 on the basis of the synchronizing signal so as to emit the LED array 11. Although the detection signal mentioned above corresponds to a vertical synchronizing signal of the CRT display, in the case where the mirror is vibrated with a vibration frequency of non sine wave such as a sawtooth wave shown in FIG. 4, the wave form is detected by the detection signal. Thus, the wave form of the signal generated by the mirror driving unit 21 may be corrected in order to act with a correct wave form.

On the other hand, the LED driving unit 19 corresponds to a horizontal or line display unit of a CRT or duty typed LCD and sequentially emits light signals corresponding to several hundreds of scans during one period of the scanning operation of the vibration mirror 12. The emission of the light signals is in response to the image signals to be displayed.

Moreover, the contents of the display stored in the memory unit 17 for storing the message signal are converted into an image signal through a character generator and transmitted to the display control unit 20. Then they are subsequently applied to the LED array 11 as a light emitting signal through the LED driving unit 19.

This means that, though the signals corresponding to one frame of the display are applied to the LED array 11 during one period of the vibration of the vibration mirror 12, and a display for one frame is performed, it is necessary to send the same image signals repeatedly because the display unit has no memory function.

In the optical system shown in FIG. 1, assuming that the focal length of the lens assembly is f (mm), the magnification/minification rate m of the lenses is approximately given as follows.

$$m = 250/f \tag{1}$$

Accordingly, in the case of using a lens assembly of f=25 mm, the magnification rate is approximately 10. Though two lenses 13 and 14 are assembled in FIG. 1, the focal length f mentioned above means that of the assembled lenses. In the case that the magnification rate is within 5, the lens portion may be constituted by one lens. It is also important that the device should be made light, and since the light source used in the device is monochromatic LED, the chromatic aberration of the lens need not to be considered. Therefore, plastic lenses having a good productivity can be employed as the lenses 13 and 14.

In the optical system of the display device, the focal length of the lenses is the most important positional relationship between the LED array, mirror and the lenses.

Figure 2:
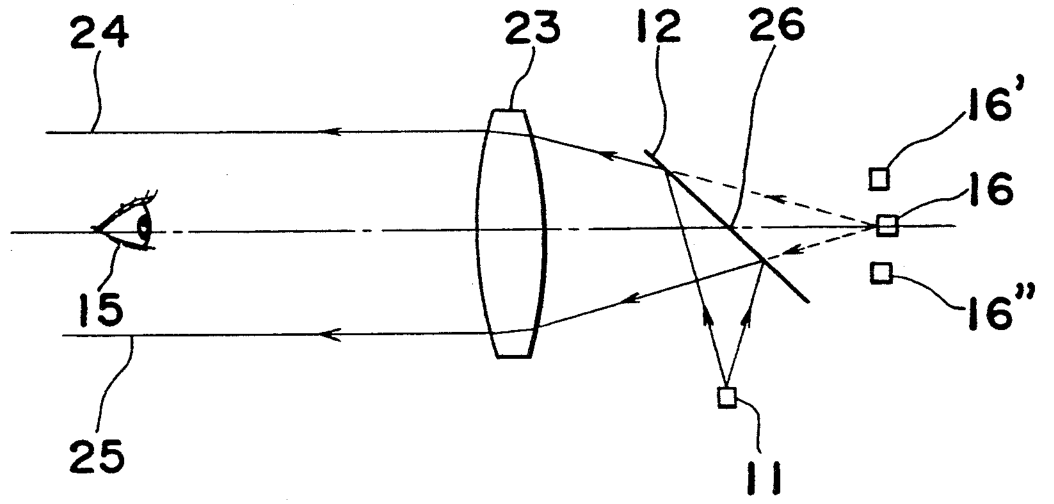
FIG. 2 is a schematic diagram showing an optical system of a display unit according to the present invention.

FIG. 2 shows an optical path in the optical system mentioned above, wherein the light signal generated by the LED array 11 is reflected by the mirror 12 and the reflected light signal is passed through the lens system 23 so as to be entered in the eye 15 of the observer. The optical path of the light generated by the LED array 11 is equivalent to that of the light as if it is generated from the position of a virtual image of the LED array 11 with respect to the mirror 12. Accordingly, the distance between the mirror 26 and the position of the virtual image 16 of the LED array 11 is equal to the distance between the mirror 26 and the LED array 11. The optical system is so constituted that the light beams passing through the lens system 23 are projected in parallel to the observer. In other words, the position of the virtual image 16 is situated on the focal plane of the lens system 23. The virtual image 16 of the LED array 11 is equivalently moved to the positions 16' and 16''' in accordance with the vibration of the mirror 12 and, also in this case, the light beams passing through the lens system 23 are projected to the observer in parallel.

By setting the optical system as described above, the projected light beams passing through the lens system 23 are entered in parallel to the eye 15 of the observer as if the light beams are generated from an infinite point. Therefore, the parallel light beams are focused on the retina of the observer so as to form a real image of the LED array 11 independently of the distance between the lens system 23 and the eye 15.

This means that the focal point of the lens system 23 is made coincident with the image position 16 of the LED array 11. Considering the optical system including the reflection mirror, the focal point of the lens system 23 is made coincident with the position of the LED array 11.

Accordingly, if the magnification rate of the optical system is set to 10, the focal length f of the lens system is approximately set to 25 mm, so that the distance between the lens system 23 and the LED array 11 (or the image position 16) through the mirror 12 is set to 25 mm.

In practical use, since there is a difference among individuals, it is necessary to provide a fine adjustment mechanism for adjusting the lens position or for adjusting the position of the LED array.

According to another different feature of a modified example, an optical system of a display device can be so constituted that the lens system 13 and 14 are disposed between the mirror 12 and the LED array 11. However, in this case, since the distance between the lens system and the LED array must be set f mm which is similar to that of the present embodiment previously described, there is a fault that the display device becomes larger than that of the previous embodiment. Moreover, according to the present invention of the previously described embodiment, though the image message scanned in the horizontal and vertical directions is enlarged to be displayed, on the contrary, in the modified example, since the image message is enlarged only-in the horizontal direction, the vibration angle of the mirror must be made larger than that of the previously described embodiment in order to obtain the same size of the image.

When the miniature display device according to the present invention, is adapted to a paging system or a pocket computer, in many cases the display device is so constituted that the display unit 31 can be removed from the main body 40 of the device. This is illustrated in FIG. 5. That is to say, the display unit 31 of the device corresponds to an earphone provided in a headphone stereo, and the main body 40 of the device, in practical use, is usually put in a pocket or a bag in the side of the observer. Only the display unit 31 connected to the main body 40 of the device through a fine flexible wire 39 is drawn out near the eye of the observer in a manner of handing a spectacle 37 so as to observe the contents of the display, upon moving the display unit 31, via hinge 38 from position B to position A as shown in FIG. 5. Therefore, the display unit must be made as small and light as possible.

Accordingly, the power source 41 for driving the LED array 11 and the vibration mirror 12 is accommodated in the main body of the device and the electric power thereof is supplied to the display unit through the flexible wire 39.

The contents of the display generated in a form of coded data signals in the main body of the device are converted into image data signals through a character generator 42 so as to drive the LED array 11. This is illustrated in FIG. 6. Further, in order to make the display unit small and light, it is preferable that the coded data signals should be converted into the image data signals in the main body 40 of the device and that the image data signals should be transmitted to the display unit 31 through the flexible wire 39.

In the display system according to the present invention, the generation of a synchronizing signal is a feature point different from that in the case of using a CRT display or LCD in the display portion. In the case of using CRT or LCD, the synchronizing signal is generated together with the image data signal in the main body 40 of the device and fed to the display unit 31. On the contrary, in the device of the system according to the present invention, the frequency of the synchronizing signal is made coincident with the frequency of the vibration of the vibration mirror which is generated by the mirror position detector 22' constituting a part of the mirror portion 12. Therefore, the vertical synchronizing signal corresponding to that in a TV image data display device is based on the output signal of the mirror position detector 22'. The synchronizing signal generated by the display unit is transmitted to the main body 40 through the flexible wire 39 and the main body 40 of the device sends an image data signal to the display unit 31 on the basis of the received synchronizing signal. In addition, though the transmission of clock pulse signals and horizontal synchronizing signals are also necessary, a portion of the signals are transmitted on the power supplying line or in a way of time division, so as to use the power supplying line for multipurpose since the number of the flexible wires connected between the body of the device and the display unit is preferably decreased. Thus, the device is made as fine and light as possible.

As described above, the display device according to the present invention comprises a light source composed of a plurality of light emitting elements arrayed in one dimension, a vibration mirror disposed opposing to the light source for obtaining two-dimensional image of said light source, device for controlling the drive of the light emitting elements of the light source by synchronizing the frequency of the emission of the light source with that of the vibration of the vibration mirror on the basis of the display data signal and optical device such as lenses for magnifying and displaying the two-dimensional image to be obtained by the vibration mirror. Further, the optical device is provided between the vibration mirror and the observation position, and the light emitting elements are situated at the focal position of the optical device. Also, the two-dimensional image of the light source is obtained by driving the vibration mirror in a high speed. That is to say, the vibration mirror performs an action equivalent to the vertical scanning in the CRT display and the light source is turned on and off by generating signals equivalent to the horizontal scanning line on the basis of the message data signals during one period of the scanning of the vibration mirror by way of the driving unit for driving the light source. Thus, the two-dimensional data of large volume can be displayed from the light source composed of light emitting elements arrayed in one dimension. Therefore, the device of the present invention is appropriate for use in a portable paging system and pocket computer of a miniature type.

From the above described embodiments of the present invention, it is apparent that the present invention may be modified as would occur to one or ordinary skill in the art without departing from the spirit and scope of the present invention which should be defined solely by the appended claims. Changes and modifications of the system contemplated by the present preferred embodiments will be apparent to one of ordinary skill in the art.

What is claimed is:

1. A miniature display apparatus comprising:

a light source for emitting light, composed of a plurality of light emitting elements arrayed in one dimension;

a vibration mirror, disposed in a position opposite to said light source, for obtaining a two-dimensional virtual image of the light emitted from said light source;

means operatively connected to said light source and vibration mirror for driving said light source to emit light and driving said vibration mirror to vibrate;

position detecting means for continuously detecting the position of the vibration mirror;

means for controlling the driving of the light emitting elements of the light source based on data to be displayed in synchronization with the continuously detected position of the vibration mirror; and optical means for magnifying and displaying the two-dimensional virtual image obtained by said vibration mirror from said light emitted from said plurality of light emitting elements arrayed in one dimension;

wherein said optical means is disposed between the vibration mirror and an observation position for observing said two-dimensional virtual image, and the position of the two-dimensional virtual image is situated at the focal position of said optical means.

2. The miniature display apparatus according to claim 1, wherein a power source for supplying power to the means for driving the light emitting elements and the vibration mirror is accommodated in a main body of a device connected to said miniature display apparatus through a flexible wire and electric power is fed to the display apparatus through said flexible wire.

3. The miniature display device according to claim 2 wherein contents generated as a coded data in the main body of the device are converted into image data signals through a character generator in the main body so as to be supplied to said means for driving the light emitting elements.

4. A miniature display apparatus for use in a handheld electronic apparatus, comprising:

light emitting means, composed of a one-dimensional array of light emitting elements, for emitting light corresponding to an image to be displayed;

a vibration mirror disposed in a position opposing said light emitting means for reflecting said emitted light;

memory means for storing image data corresponding to said image to be displayed;

first drive means, operatively connected to said vibration mirror, for driving said vibration mirror to vibrate so as to obtain a two-dimensional image reflected by said vibration mirror from said one-dimensional array of light emitting elements;

position detecting means for continuously detecting the position of the vibration mirror;

second drive means, operatively connected to said memory means and said light emitting means, for driving said light emitting means to emit light in response to said stored image data;

optical means, operatively connected to said vibration mirror, for magnifying and displaying said two-dimensional image corresponding to said data stored in said memory means; and control means, operatively connected to said first drive means, said second drive means, and said position detecting means for synchronizing the driving of said first driving means and said second driving means based on said data stored in said memory means and said continuously detected position of said vibration mirror, to thereby display a two-dimensional image corresponding to data stored in said memory means by use of the one-dimensional array of light emitting elements.

5. An apparatus, as claimed in claim 4, wherein said optical means comprises first and second lenses.

6. An apparatus, as claimed in claim 5, wherein said first and second lenses are plastic so as to be lightweight and thus convenient for use in a hand-held electronic device.

7. An apparatus, as claimed in claim 4, wherein said hand-held electronic device is a mini-computer.

8. An apparatus, as claimed in claim 4, wherein said hand-held electronic device is a pager.

9. An apparatus, as claimed in claim 4, wherein said first drive means includes:

mirror drive means, operatively connected to said control means, for receiving signals from said control means and for outputting corresponding electronic pulses; and a coil, operatively connected to said mirror drive means and said vibration mirror, for vibrating said vibration mirror in response to said electronic pulses from said mirror drive means.

10. An apparatus, as claimed in claim 4, wherein said hand-held electronic apparatus includes a signal receiver for receiving information from a central sending station and stores said received information in said memory means of said miniature display apparatus.

11. An apparatus, as claimed in claim 10, wherein said miniature display apparatus is connected to a main body of the receiver through a fine, flexible wire.

12. An apparatus, as claimed in claim 4, wherein said light emitting means is so disposed that the two-dimensional virtual image of the light emitted by said light emitting means with respect to said vibration mirror is situated at the focal position of said optical means.

13. A method of displaying an image on a miniature display device, comprising the steps of:

a) emitting light corresponding to an image to be displayed from a one-dimensional array of light emitting elements;

b) reflecting the emitted light by utilizing a vibration mirror;

c) storing image data corresponding to the image to be displayed;

d) driving the vibration mirror to vibrate so as to obtain a two-dimensional image reflected by the vibration mirror from the one-dimensional array of light emitting elements;

e) detecting, continuously, the position of the vibration mirror;

f) driving the light emitting elements to emit light in response to the stored image data;

g) magnifying and displaying a two-dimensional image corresponding to the data stored in memory; and h) synchronizing the driving of the vibration mirror and the driving of the light emitting elements based on data signals corresponding to the stored image data and the continuously detected position of the vibration mirror, to thereby display a two-dimensional image corresponding to data stored in memory by use of the one-dimensional array of light emitting elements.

* * * * *